United States Patent [19]
Watanabe et al.

[11] Patent Number: 5,923,391
[45] Date of Patent: *Jul. 13, 1999

[54] ACTIVE MATRIX LCD DEVICE HANG A LIGHT SHIELDING LAYER WITH PARTICULAR RUBBING DIRECTIONS

[75] Inventors: Takanori Watanabe, Atsugi; Mamoru Miyawaki, Isehara; Shunsuke Inoue, Yokohama; Tetsunobu Kochi, Hiratsuka, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/491,732
[22] Filed: Jun. 19, 1995

[30] Foreign Application Priority Data

Jun. 20, 1994 [JP] Japan .................................. 6-137324
Jun. 7, 1995 [JP] Japan .................................. 7-140566

[51] Int. Cl.$^6$ .......................... G02F 1/1333; G02F 1/136; G02F 1/1337
[52] U.S. Cl. ............................. 349/110; 349/111; 349/42; 349/44; 349/126
[58] Field of Search .................. 359/67, 59, 61; 349/110, 111, 44, 42, 126

[56] References Cited

U.S. PATENT DOCUMENTS

| | | |
|---|---|---|
| 4,834,507 | 5/1989 | Kato et al. ................... 359/59 |
| 5,218,232 | 6/1993 | Yuzurihara et al. ............ 257/754 |
| 5,345,324 | 9/1994 | Koseki et al. ................. 359/67 |
| 5,412,240 | 5/1995 | Inoue et al. .................. 257/347 |
| 5,434,441 | 7/1995 | Inoue et al. .................. 257/347 |
| 5,446,562 | 8/1995 | Sato ........................... 359/67 |

FOREIGN PATENT DOCUMENTS 1266512 10/1989 Japan .

Primary Examiner—William L. Sikes
Assistant Examiner—Toan Ton
Attorney, Agent, or Firm—Fitzpatrick, Cella, Harper & Scinto

[57] ABSTRACT

A liquid crystal display device comprises two parallel substrates holding a liquid crystal material filling space between two parallel substrates, wherein one of the two parallel substrates is provided, for each picture element, with a transparent electrode and a lightshielding layer which has an opening located inside the outer periphery of the transparent electrode as observed from a direction perpendicular to the two substrates, and the lightshielding layer is designed so that the distance from an outer periphery of the transparent electrode to an outer periphery of the opening is set substantially larger on the side where rubbing of one substrate is started than on the side where the rubbing is ended, whereas it is set substantially larger on the side where the rubbing of the other substrate is ended than on the side where the rubbing is started as observed from a direction perpendicular to the two substrates.

19 Claims, 5 Drawing Sheets

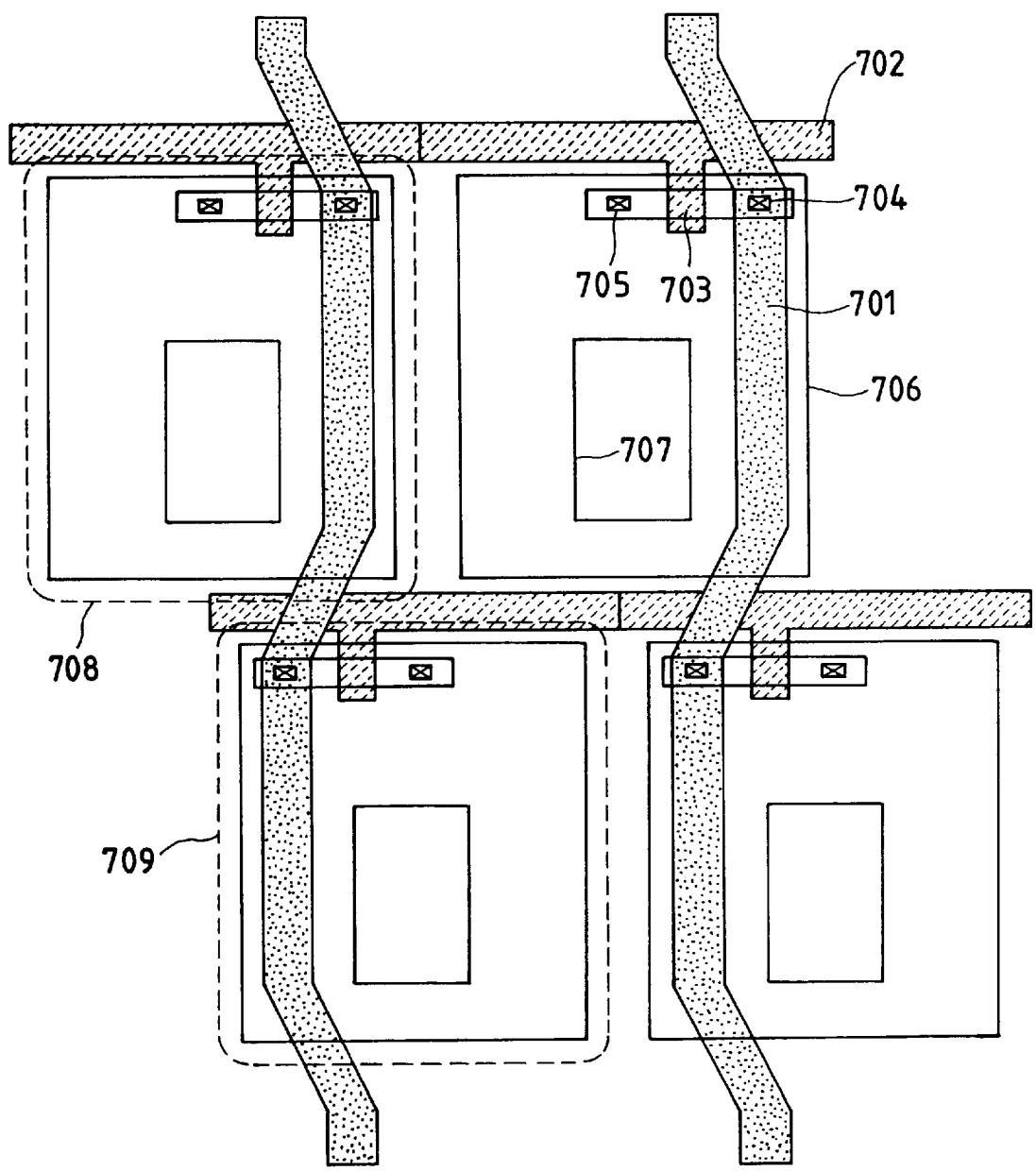

ACTIVE MATRIX LCD DEVICE HANG A LIGHT SHIELDING LAYER WITH PARTICULAR RUBBING DIRECTIONS

BACKGROUND OF THE INVENTION

1. Field of the Invention

The present invention relates to a liquid crystal display device which features high light transmittance and high contrast and, more particularly, to a lightshielding layer thereof.

2. Related Background Art

Information-oriented society is rapidly growing with growing popularity of multimedia. In this trend, a thin, flat display is becoming an important device to expand multimedia market as a replacement of cathode ray tube (CRT) serving as an interface between computer and man. A liquid crystal display, a plasma display (PDP), and an electron beam flat display are promising candidates as such a flat display. Among these promising candidates, liquid crystal displays are finding a significantly expanding market with the increasing popularity of small personal computers. Among the liquid crystal displays, an active matrix liquid crystal display provides a high contrast on a whole screen because it is free of crosstalk in comparison with a direct matrix liquid crystal display such as an STN liquid crystal display. Due to this feature, the active matrix liquid crystal display is attracting attention in such applications as the viewfinder of a video camera, projector, and thin television as well as the display of a small personal computer.

A liquid crystal display includes a liquid crystal material held between two electrodes, the surfaces of which have been subjected to rubbing treatment. Voltage is applied to the electrodes to apply an electric field to the liquid crystal; the orientation of liquid crystal molecules is controlled by the electric field to modulate the polarizing direction of light, thereby turning ON or OFF the light. For the liquid crystal, twisted nematic (TN) liquid crystal is frequently used.

In an active matrix liquid crystal display device, the orientation of the liquid crystal is changed by turning ON or OFF the application of a predetermined electric field which is present between a picture element electrode and an opposing electrode. Most of recent liquid crystal display devices employ normally-white mode wherein light is let pass through to provide white display when no electric field is applied between the two electrodes whereas the light is not allowed to pass through to provide black display when the electric field is applied.

The electric field generated by the picture element electrode and the opposing electrode is nonuniform around the picture element electrode, letting light pass through in the vicinity of the outer periphery of the picture element electrode in the case of the black display, resulting in a deteriorated contrast of the display device. This phenomenon is called disclination. In the past, the vicinity of the outer periphery of the picture element electrode is shielded against light to avoid the contrast degradation by the disclination.

FIG. 4 shows a conventional lightshielding layer. In FIG. 4, reference numeral 501 denotes one of the picture element electrodes and reference numeral 502 denotes an opening of the lightshielding layer. The periphery of the picture element electrode 501 matches with the outer periphery of the lightshielding layer. All areas except the area of 502 are shielded against light, thus always providing the black display regardless of the voltage applied to the picture element electrode. The area where the disclination takes place depends on the direction in which the picture element electrode has been rubbed and therefore, the disclination grows larger upward when the picture element electrode has been rubbed from top to bottom in the direction as shown by arrow E in FIG. 4. For this reason, as shown in the drawing illustrative of the position of the picture element electrode 501 with respect to the opening 502, it is effective to set different distances at the top and bottom of the opening 502 by setting a distance 503 larger than a distance 504, for example (Japanese Patent Laid-Open Application No. 1-266512). In the past, the distances 505 and 506 were set nearly the same to conceal the influences observed at the right and left ends of the picture element electrode, thereby preventing the contrast from deteriorating.

FIG. 5 shows the layout of picture elements in conventional aligned arrangement. A transistor 603 is formed at the intersection of a signal line 601 and a gate line 602, the transistor 603 being connected to the signal line 601 through a contact 604. One electrode of the transistor 603 is connected to an picture element electrode 606 via a through hole 605. The deterioration in the contrast caused by the disclination is prevented by shielding the area except an opening 607 against light. In the drawing, the opening 607 is positioned so that it is vertically asymmetrical and laterally symmetrical.

FIG. 6 shows the layout of the picture elements in a conventional delta arrangement. A transistor 703 is formed at the intersection of a signal line 701 and a gate line 702, the transistor 703 being connected to the signal line 701 through a contact 704. One electrode of the transistor 703 is connected to an picture element electrode 706 via a through hole 705. The deterioration in the contrast caused by the disclination is prevented by shielding the area except an opening 707 against light. In the layout of the panel having the delta arrangement, picture element cells 708 and 709 employ the same but reversed layouts in order to prevent a flicker resulting from the different characteristic of picture element of each stage and also to prevent the deterioration in the image quality of a stripe pattern or the like. The opening 707 shown in this drawing is vertically asymmetrical but laterally symmetrical.

An attempt to achieve higher definition and reduced size of a liquid crystal display device would inevitably reduce the size of a picture element and the percentage of the area occupied by the opening would reduce markedly if the lightshielding section is made larger to prevent the disclination. For instance, in the case of a picture element electrode of 20 $\mu$m square, if the disclination takes place in an area of about 5 $\mu$m from an end of the picture element electrode, then the percentage of the area occupied by the opening will be 10 $\mu$m square, namely, 25% of the size of the picture element electrode.

The percentage of the area occupied by the opening would be infinitely close to zero percent if the liquid crystal display device is designed to avoid the disclination and the size of the picture element electrode is set to 10 $\mu$m square in an attempt to reduce the area of a picture element so as to achieve even higher definition or further reduced size. Reducing the percentage of the area occupied by the opening results in a liquid crystal display device which would let little light to pass through and therefore provide an extremely dark display.

Thus, there was a problem in that fabricating a liquid crystal display device which has a smaller-area picture element unavoidably involves an undesirably small percentage of the area occupied by the opening. This means a dark display image; therefore, in the case of a transmitting-type liquid crystal display device, a bright backlight must be used to obtain sufficient brightness, presenting a problem of increased consumption of electric power.

SUMMARY OF THE INVENTION

This invention has been made with a view toward solving the above problems and an object of the present invention is to achieve a compact, light-weight, inexpensive liquid crystal display device featuring high brightness and high definition by increasing the percentage of the area occupied by the opening.

The inventor has focused attention on the fact that the disclination caused by the nonuniformity in the electric field around an end of a picture element electrode is closely connected also with the rubbing direction of an orientation film in contact with a liquid crystal material. More specifically, the inventor has turned his attention to the fact that the disclination wherein the area around an end of a picture element electrode becomes transparent even in the case of black display grows worse upward and also toward the right because of the rubbing direction of an opposing electrode when the picture element electrode has been rubbed from top to bottom and the opposing electrode has been rubbed from left to right.

The present invention provides a wide lightshielding layer in an area where more disclination takes place and a narrow lightshielding layer in an area where less disclination takes place. To be more specific, a liquid crystal display device according to the present invention has two parallel substrates holding a liquid crystal material between them, each picture element being provided with a transparent electrode and a lightshielding layer which has an opening located inside the outer periphery of the transparent electrode as observed from a direction perpendicular to the two substrates. In the lightshielding layer, the distance from the outer periphery of the transparent electrode to the outer periphery of the opening is set substantially larger on the side where the rubbing of one substrate mention above is begun than on the side where the rubbing is ended as observed from a direction perpendicular to the two substrates, whereas it is made substantially larger on the side where the rubbing of the other substrate is ended than on the side where the rubbing is started. FIG. 1A shows an active matrix liquid crystal display device; it is illustrative of the positional relationship between a picture element electrode 101 and an opening 102, where a substrate on the side of the picture element electrode (,i.e. one substrate) has been rubbed from top to bottom in the direction as shown by arrow A in FIG. 1A, and a substrate on the side of the opposing electrode (, i.e. the other substrate) has been rubbed from left to right in the direction as shown by arrow B in FIG. 1A. According to the present invention, the distance from the outer periphery of the transparent electrode to the outer periphery of the opening is made substantially larger on a start side 103 than on an end side 104 of the rubbing of one substrate, whereas the distance is made substantially larger on an end side 106 than on a start side 105 of the rubbing of the other substrate. If the distance between one substrate and the other substrate, namely, the cell gap, is g μm, then the distance 103 should be substantially set to 5/4·g μm, the distance 104 to ⅕·g μm, the distance 105 to ½·g μm, and the distance 106 to ¾·g μm. For instance, if the cell gap ranges from 2 to 5 μm, then the distance 103 should be set to 2.5 to 6 μm, the distance 104 to 1.5 to 4 μm, the distance 105 to 1 to 3 μm, and the distance 106 to 2 to 4 μm. Further preferably, if the cell gap is 4 μm, then the distance 103 should be set to 5 μm, the distance 104 to 3.2 μm, the distance 105 to 2 μm, and the distance 106 to 3 μm.

The liquid crystal display device may be of either direct matrix or active matrix. The active matrix, however, exhibits marked effect. In the case of an active matrix liquid crystal display device, the picture element electrodes may be laid out in either the delta arrangement or the aligned arrangement. Especially when the delta arrangement is adopted, the picture element electrodes should be divided into the right and left sides of a data line for each line. Further, the pattern for connecting the picture element electrode and the data line should be designed so that it is laterally reversed at an odd line and an even line. The pattern is indicative of the positional relationship between a switching element and the data line. In this case, the position of the opening with respect to the picture element electrode should be identical on an odd line and on even line.

It is apparent that a liquid crystal display device according to the present invention provides the same advantages whether it employs a transmitting type panel or a reflecting type panel having picture element electrodes as reflecting electrodes. It is also apparent that the advantages of the present invention are effective regardless of whether the driving circuit thereof employs a CMOS circuit formed on a bulk silicon member, a single-type MOS circuit or a thin-film semiconductor transistor as in the picture element.

According to the present invention, an opening which optimally conceals the disclination caused by rubbing and which has an optimum shape for securing brightness can be provided, enabling a liquid crystal display device with bright panel and high contrast to be achieved.

Further according to the present invention, a larger percentage of the area occupied by the opening can be accomplished while minimizing the sacrifice in contrast caused by the nonuniformity in the electric field at an end of a picture element electrode, thus enabling a liquid crystal display device with bright panel to be obtained. In addition, it becomes possible to design a picture element in a smaller cell size, enabling a high-definition display device to be obtained. Moreover, since the display unit can be made smaller, the cost of the completed liquid crystal display device itself can be reduced and an optical system and mounted components can also be made smaller, resulting in reduced cost.

BRIEF DESCRIPTION OF THE DRAWINGS

FIG. 6 is an explanatory diagram of the picture element layout according to the prior art.

DETAILED DESCRIPTION OF THE PREFERRED EMBODIMENTS

[First Embodiment]

Figure 1A:
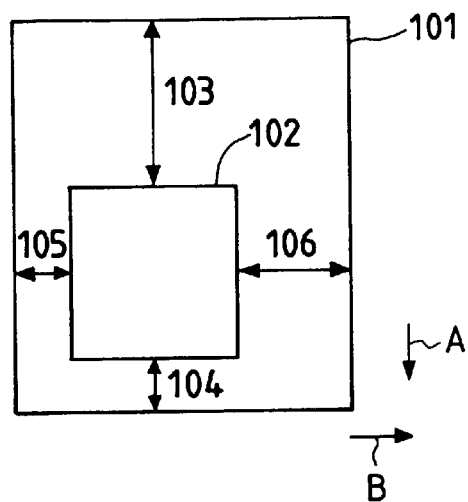
FIGS. 1A and 1B are explanatory diagrams illustrative of the features of the present invention.

FIG. 1A is the explanatory diagram illustrative of the first embodiment according to the present invention. Reference numeral 101 denotes the picture element electrode and reference numeral denotes the opening. The picture element electrode is rubbed from top to bottom in the drawing. At this time, the distance 103 from the outer periphery of the picture element electrode to the opening is set larger than the distance 104 at the bottom so as to avoid the contrast degradation by the disclination which occurs at the top edge of the picture element electrode. In this embodiment, the distance 106 from the right outer periphery to the opening is also set larger than the distance 105 from the left outer periphery to the opening.

The opposing substrate is also subjected to the rubbing treatment; the rubbing direction is different from that for the picture element electrode. In the present invention, the rubbing is performed from left to right, for example, as shown in FIG. 1A. This narrows the disclination occurring at the end of the left picture element and therefore the contrast does not deteriorate even if the distance 105 is smaller than the distance 106.

Figure 2:
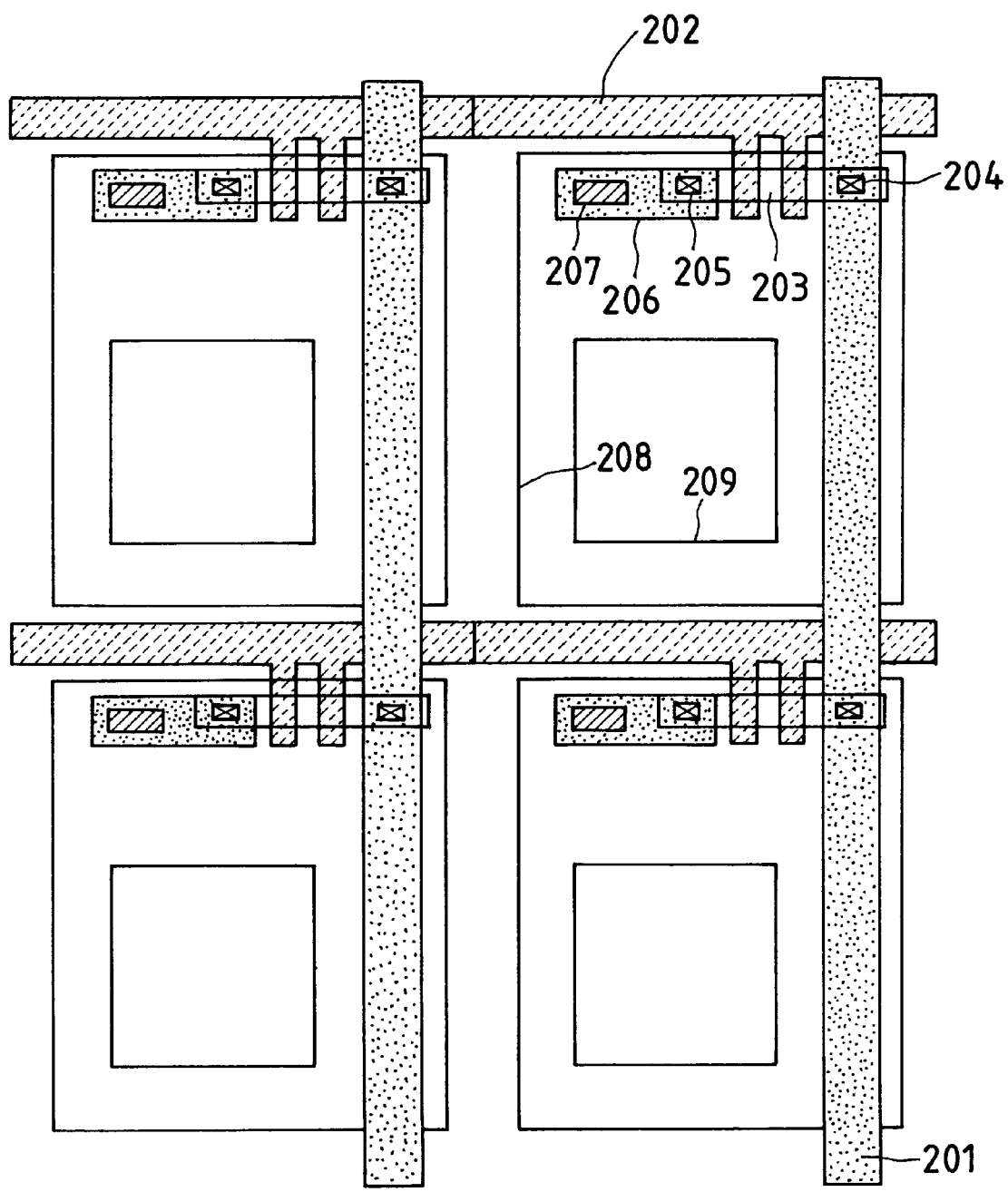
FIG. 2 is an explanatory diagram of the picture element layout according to a first embodiment.

FIG. 2 shows the picture element layout according to the present invention. A transistor 203 is formed at the intersection of a signal line 201 and a gate line 202. The gate of the transistor is divided into two pieces to minimize leakage current. This may be indicated by an equivalent circuit which has two transistors connected in series. Even if one transistor develops leakage, currents are not allowed to flow if the other transistor is OFF, thus dramatically decreasing the chances of damage to the display unit, thus leading to higher yield.

The transistor 203 is connected to the signal line 201 through a contact 204. One electrode of the transistor 203 is connected through a contact 205 to a conductive layer 206 which is made of the same material used for the signal line 201, for example, and also connected to a picture element electrode 208 via a through hole 207. This improves the contact between the picture element electrode and the electrode 205 of the transistor, thereby making it possible to prevent uneven gradation or scratches on the display unit. The conductive layer 206 is provided in this embodiment; however, it is apparent that the advantages of the present invention are effective also when the electrode 205 of the transistor is directly connected to the picture element electrode 208 as in the example of the conventional art.

In the case of an opening 209 in the first embodiment, the distance from the left outer periphery of the picture element electrode 208 to the opening is set smaller than the distance from the right outer periphery to the opening. This enables a larger opening, making it possible to achieve a liquid crystal display device with bright panel. The first embodiment will be described using an example wherein the embodiment is applied to the 20 $\mu$m-square picture element electrode mentioned in the description of the prior art. Even when it is assumed that the disclination occurs in a 5 $\mu$m margin each at the top and bottom ends of the picture element as in the example of the prior art, the disclination occurs in 5 $\mu$m only on the top end, the disclination being smaller on the bottom end. Assuming that the disclination affects 2 $\mu$m on the left end, 3 $\mu$m on the right end and 3.2 $\mu$m on the bottom end and the margin of the gap between the lightshielding layer and the picture element electrode is 1 $\mu$m, the area of the opening will gbe 44% of the area of the picture element electrode which is 1.8 times the percentage 25% shown in the example of the prior art. This means that the use of the present invention achieves 1.8-fold brightness of the panel. The numeric data used in this description are obtained when rayon cloth is used for the rubbing treatment and the picture element electrode is rubbed from top to bottom.

Further, the invention makes it possible to design a picture element in a smaller cell size, enabling a high-definition display unit. In addition, since the display unit can be made smaller, the cost of the completed liquid crystal display device itself can be reduced and an optical system and mounted components can also be made smaller, resulting in reduced cost. The products applying the invention include an electronic viewfinder, a liquid crystal projector, a projection television, a head-mounted display, etc. The compact size of these products makes them suitable for portable use.

[Second Embodiment]

The first embodiment refers to a case where the invention is applied to a simple arrangement in which the picture elements are linearly aligned vertically and horizontally. The delta arrangement, wherein the picture element array is shifted by 0.5 picture element for each stage provides higher definition for the same number of picture elements. Accordingly, display units employing the delta arrangement are used more frequently. The layout of the delta arrangement is shown in FIG. 6.

The second embodiment shows a case wherein the invention is applied to the delta arrangement. Applying the liquid crystal display device directly to the second embodiment would cause each stage to have a different distance from the opening to an end of the picture element electrode. For this reason, the area of the opposing electrode which corresponds to the picture elements of an even stage, for example, must be rubbed from left to right, whereas the area of the opposing electrode which corresponds to the picture elements of an odd stage must be rubbed from right to left. This is extremely difficult to carry out.

Figure 3:
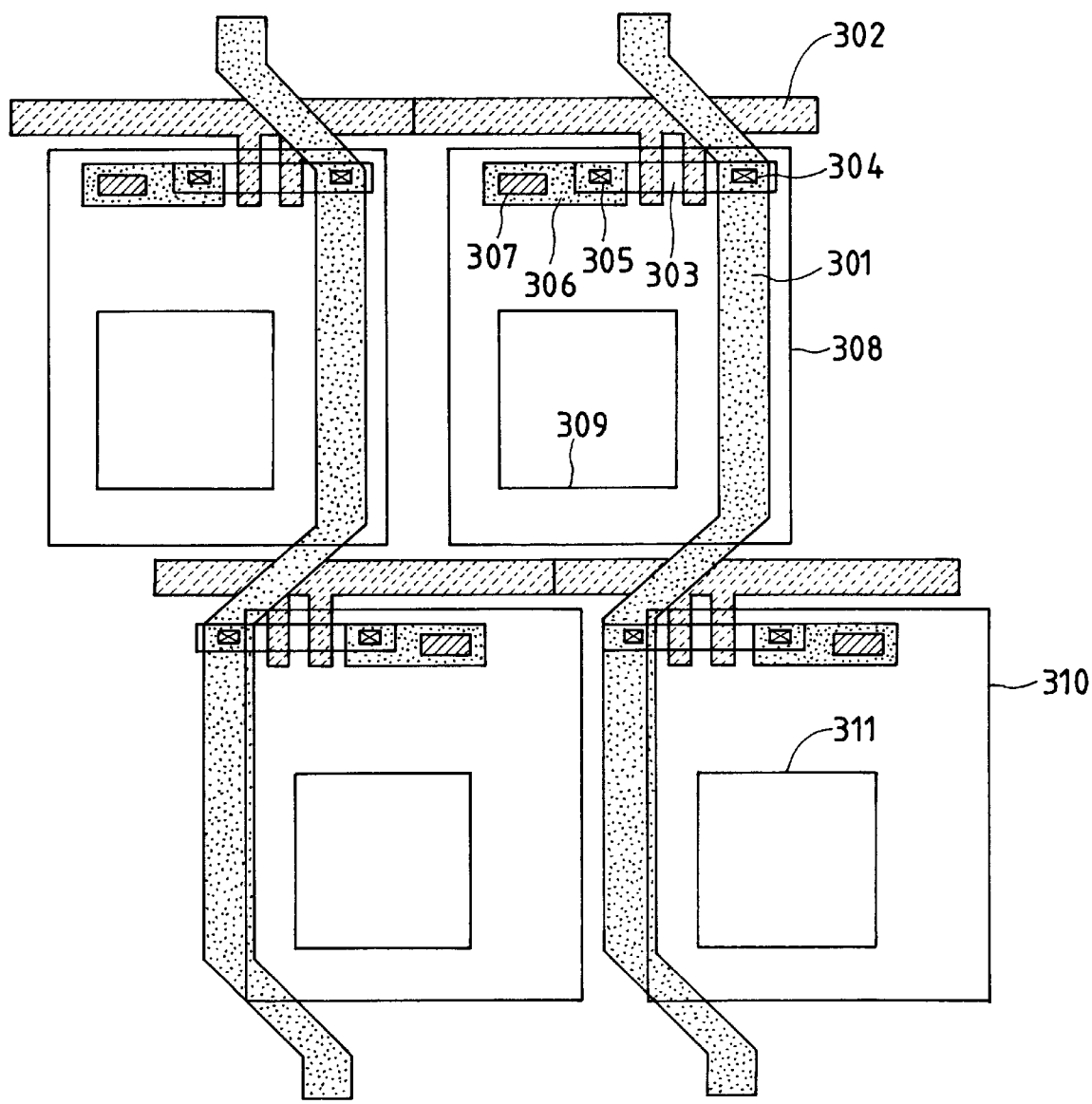
FIG. 3 is an explanatory diagram of the picture element layout according to a second embodiment.
Figure 5:
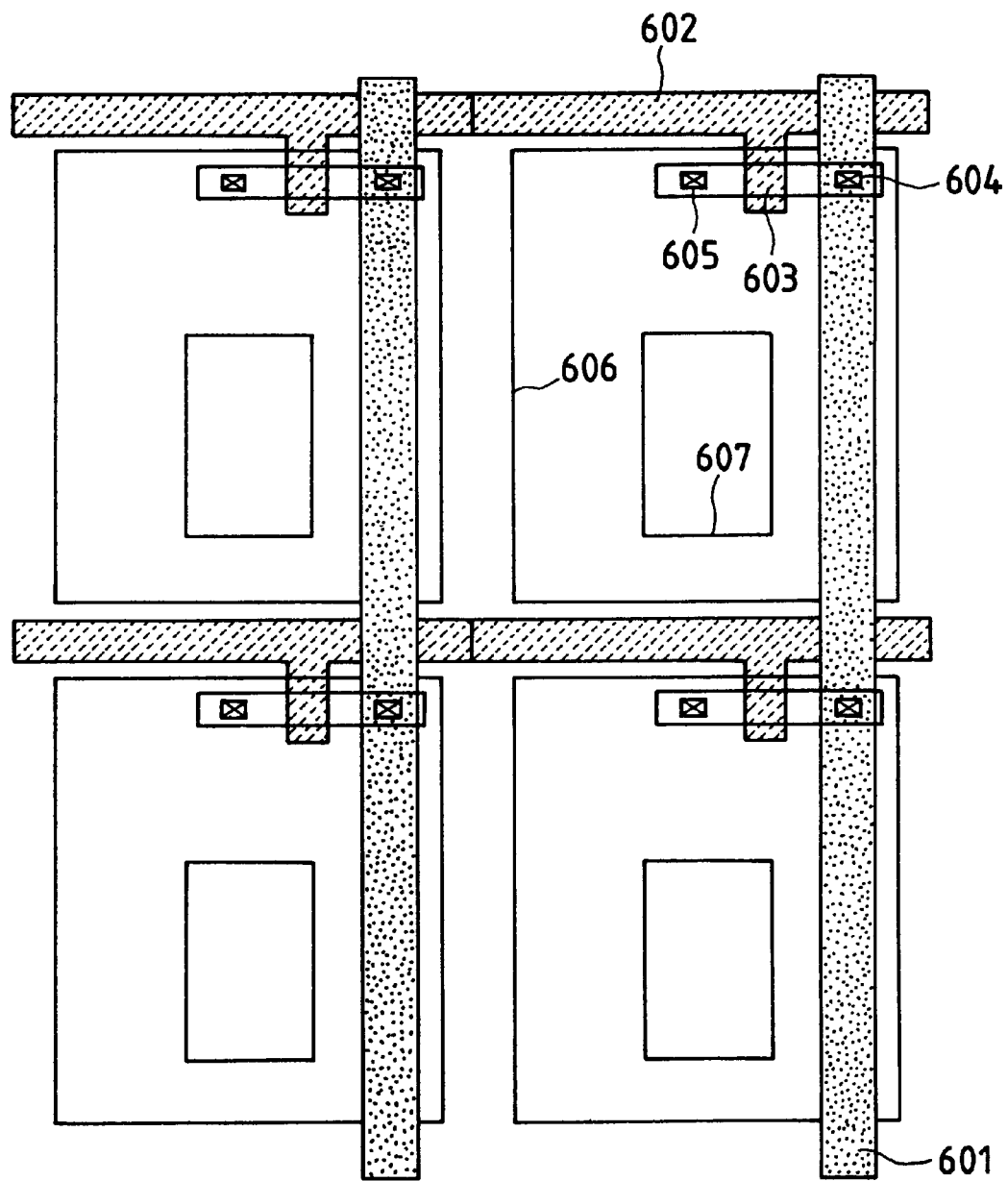
FIG. 5 is an explanatory diagram of the picture element layout according to the prior art.

FIG. 3 shows the picture element layout according to the invention. A transistor 303 is formed at the intersection of a signal line 301 and a gate line 302, the transistor 303 being connected to the signal line 301 through a contact 304. One electrode of the transistor 303 is connected through a contact 305 to a conductive layer 306 which is made of the same material used for the signal line 301, for example, and also connected to a picture element electrode 308 via a through hole 307.

Reference numeral 310 denotes a picture element in an adjoining stage and reference numeral 311 denotes the opening. In this embodiment, the wiring and transistor pattern in the picture element having the picture element electrode 308 are laterally reversed from those in the picture element having the picture element electrode 310. The positional relationship between the picture element electrode, the wiring, and the transistor differs between the electrodes 308 and 310. Hence, despite that the wiring and transistor pattern is laterally reversed, the positional relationship between the picture element electrode 308 and the opening 309 is identical to that between the picture element electrode 310 and the opening 311. Thus, the distance between the left edge of the picture element electrode and the opening can be reduced and the invention can be achieved by rubbing the opposing electrode in the positional direction.

In FIG. 3, the picture element electrode 308 and the picture element electrode 310 share the same configuration. Depending on the pattern of the wiring or others, the configuration of the picture element electrode itself can be changed for each stage for the connection with the through hole 307. Thus, a panel which has the delta arrangement according to the present invention can be accomplished. The result is a high-definition, bright, small panel.

[Third Embodiment]

Figure 1B:
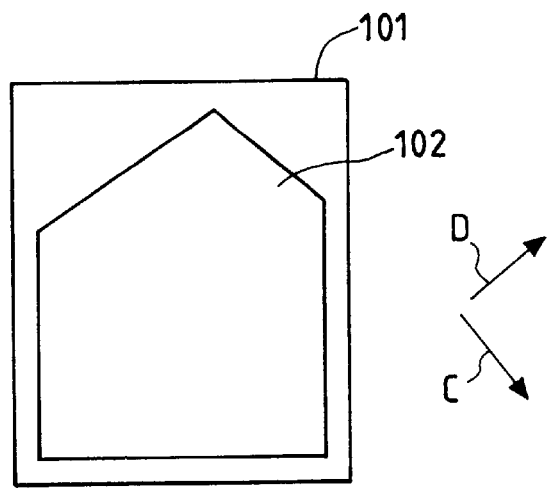
Figure 4:
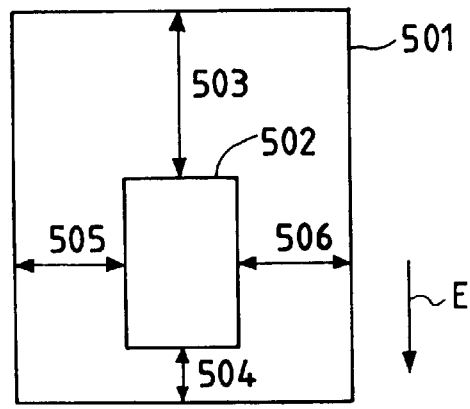
FIG. 4 is an explanatory diagram illustrative of a prior art.

The third embodiment is an example showing the shape of the opening in the case where the electrodes are rubbed aslant at a 45-degree angle with respect to the outer periphery of the picture element electrode. FIG. 1B shows the positional relationship between the picture element electrode 101 and the opening 102 of the third embodiment. When the picture element electrode is rubbed from top left to bottom right in the direction as shown by arrow C in FIG. 1B and the opposing electrode is rubbed from bottom left to top right in the direction as shown by arrow D in the same figure, the disclination tends to appear at the top left end and the top right end of the picture element electrode. Hence, the shape of the opening 102 should be pentagonal as shown in the drawing. In this case, the area of the opening is 50% to 75% of the area of the picture element electrode, enabling the panel to have 2- to 2.5-fold brightness compared with the conventional panel.

What is claimed is:

1. A liquid crystal display device comprising:

a first substrate rubbed in a first direction;

a second substrate rubbed in a second direction different from the first direction. said second substrate being parallel to said first substrate; and a liquid crystal material filling space between said first and second substrates, said first substrate being provided, for each picture element, with a picture element electrode and a light shielding layer which has an opening located inside an outer periphery of said picture element electrode as observed from a direction perpendicular to said first and second substrates, and said light shielding layer being designed so that, with regard to the first direction, the distance from the outer periphery of each said picture element electrode on a side where rubbing of said first substrate is started to an outer periphery of the opening is set larger than the distance from the outer periphery of each said picture element electrode on a side where the rubbing of said first substrate is ended to the outer periphery of the opening, and, with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates.

2. A liquid crystal display device according to claim 1, wherein said first and second directions are orthogonal to each other.

3. A liquid crystal display device according to claim 1, wherein the distance between said first substrate and said second substrate is set in a range of 2 to 5 $\mu$m.

4. A liquid crystal display device according to claim 1, wherein, if the distance between said first substrate and said second substrate is g, then the distance from the outer periphery of each said picture element electrode on a side where rubbing of said first substrate is started to said outer periphery of the opening is set to ⅝ g, and the distance from the outer periphery of each said picture element electrode on a side where rubbing of said first substrate is ended to said outer periphery of the opening is set to ⅘ g, with regard to the first direction.

5. A liquid crystal display device according to claim 1, wherein, if the distance between said first substrate and said second substrate is g, then the distance from the outer periphery of each said picture element electrode on a side where rubbing of said second substrate is started to said outer periphery of the opening is set to ½ g, and the distance from the outer periphery of each said picture element electrode on a side where rubbing of said second substrate is ended to said outer periphery of the opening is set to ¾ g, with regard to the second direction.

6. A liquid crystal display device according to claim 1, wherein said second substrate has a common electrode.

7. A liquid crystal display device, comprising:

a first substrate rubbed in a first direction;

a second substrate rubbed in a second direction different from the first direction, said second substrate being parallel to said first substrate; and a liquid crystal material filling space between said first and second substrates, said first substrate being provided, for each picture element, with a picture element electrode and a light shielding layer which has an opening located inside an outer periphery of said picture element electrode as observed from a direction perpendicular to said first and second substrates, and said light shielding layer being designed so that, with regard to the first direction, the distance from the outer periphery of each said picture element electrode on a side where rubbing of said first substrate is started to an outer periphery of the opening is set larder than the distance from the outer periphery of each said picture element electrode on a side where the rubbing of said first substrate is ended to the outer periphery of the opening, and, with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates. wherein the distance between said first substrate and said second substrate is set in a range of 2 to 5 $\mu$m and wherein the distance from the outer periphery of each said picture element electrode on a side where rubbing of said first substrate is started to said periphery of the opening is set in a range of 2.5 to 64 $\mu$m, and the distance from the outer periphery of each said picture element electrode on a side where rubbing of said first substrate is ended to said outer periphery of the opening is set in a range of 1.5 to 4 $\mu$m, with regard to the first direction.

8. A liquid crystal display device, comprising:

a first substrate rubbed in a first direction;

a second substrate rubbed in a second direction different from the first direction, said second substrate being parallel to said first substrate; and a liquid crystal material filling space between said first and second substrates, said first substrate being provided, for each picture element, with a picture element electrode and a light shielding layer which has an opening located inside an outer periphery of said picture element electrode as observed from a direction perpendicular to said first and second substrates, and said light shielding layer being designed so that, with regard to the first direction, the distance from the outer periphery of each said picture element electrode on a side where rubbing of said first substrate is started to an outer periphery of the opening is set larger than the distance from the outer periphery of each said picture element electrode on a side where the rubbing of said first substrate is ended to the outer periphery of the opening. and, with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates, wherein the distance between said first substrate and said second substrate is set in a range of 2 to 5 $\mu$m and wherein the distance from the outer periphery of each said picture element electrode on a side where rubbing of said second substrate is started to said outer periphery of the opening is set in a range of 1 to 3 $\mu$m, and the distance from the outer periphery of each said picture element electrode on a side where rubbing of said second substrate is ended to said outer periphery of the opening is set in a range of 2 to 4 $\mu$m, with regard to the second direction.

9. A liquid crystal display device comprising:

a first substrate, rubbed in a first direction, on which plural picture element electrodes are arranged in plural rows and columns, and a light shielding layer having an opening located inside an outer periphery of said picture element electrode and a data line to which each of said picture element electrodes on a same column is connected are arranged, wherein groups of said picture element electrodes arranged in each of said rows adjoining each other are alternately arranged;

a second substrate rubbed in a second direction different from the first direction, said second substrate being parallel to said first substrate; and a liquid crystal material filing space between said first and second substrates, wherein said picture element electrodes arranged on even-numbered ones of said rows and those arranged on odd-numbered ones of said rows are connected to said data line at respective sides opposite to each other, and each of said picture element electrodes and openings are structured so that, with regard to the first direction, the distance from the outer periphery of each said picture element electrode on a side where rubbing of said first substrate is started to an outer periphery of the opening is set larger than the distance from the outer periphery of said picture element electrode on a side where rubbing of said first substrate is ended to the outer periphery of the opening, and with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates.

10. A liquid crystal display device according to claim 9, wherein said first and second directions are orthogonal to each other.

11. A liquid crystal display device according to claim 9, wherein the distance between said first substrate and said second substrate is set in a range of 2 to 5 $\mu$m.

12. A liquid crystal display device according to claim 9, wherein, if the distance between said first substrate and said second substrate is g, then the distance from the outer periphery of each said picture element electrode on a side where rubbing of said second substrate is started to said outer periphery of the opening is set to ½ g, and the distance from the outer periphery of each said picture element electrode on a side where rubbing of said second substrate is ended to said outer periphery of the opening is set to ¾ g, with regard to the second direction.

13. A liquid crystal display device according to claim 9, wherein said second substrate has a common electrode.

14. A liquid crystal display device according to claim 9, wherein each said picture element electrode is connected to the data line via a switching element.

15. A liquid crystal display device according to claim 14, wherein said switching element comprises a transistor.

16. A liquid crystal display device, comprising:

a first substrate. rubbed in a first direction, on which plural picture element electrodes are arranged in plural rows and columns. and a light shielding layer having an opening located inside an outer periphery of said picture element electrode and a data line to which each of said picture element electrodes on a same column is connected are arranged, wherein groups of said picture element electrodes arranged in each of said rows adjoining each other are alternately arranged;

a second substrate rubbed in a second direction different from the first direction, said second substrate being parallel to said first substrate; and a liquid crystal material filing space between said first and second substrates, wherein said picture element electrodes arranged on even-numbered ones of said rows and those arranged on odd-numbered ones of said rows are connected to said data line at respective sides opposite to each other, and each of said picture element electrodes and openings are structured so that, with regard to the first direction, the distance from the outer periphery of each said picture element electrode on a side where rubbing of said first substrate is started to an outer periphery of the opening is set larger than the distance from the outer periphery of said picture element electrode on a side where rubbing of said first substrate is ended to the outer periphery of the opening, and with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates, wherein the distance between said first substrate and said second substrate is set in a range of 2 to 5 $\mu$m and wherein the distance from the outer periphery of said picture element electrode on a side where rubbing of said first substrate is started to said outer periphery of the opening is set in a range of 2.5 to 6 $\mu$m, and the distance from the outer periphery of each said picture element electrode on a side where rubbing of said first substrate is ended to said outer periphery of the opening is set in a range of 1.5 to 4 $\mu$m, with regard to the first direction.

17. A liquid crystal display device, comprising:

a first substrate. rubbed in a first direction, on which plural picture element electrodes are arranged in plural rows and columns, and a light shielding layer having an opening located inside an outer periphery of said picture element electrode and a data line to which each of said picture element electrodes on a same column is connected are arranged, wherein groups of said picture element electrodes arranged in each of said rows adjoining each other are alternately arranged;

a second substrate rubbed in a second direction different from the first direction, said second substrate being parallel to said first substrate; and a liquid crystal material filing space between said first and second substrates, wherein said picture element electrodes arranged on even-numbered ones of said rows and those arranged on odd-numbered ones of said rows are connected to said data line at respective sides opposite to each other, and each of said picture element electrodes and openings are structured so that, with regard to the first direction, the distance from the outer periphery of each said picture element electrode on a side where rubbing of said first substrate is started to an outer periphery of the opening is set larger than the distance from the outer periphery of said picture element electrode on a side where rubbing of said first substrate is ended to the outer periphery of the opening, and with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates, wherein the distance between said first substrate and said second substrate is set in a range of 2 to 5 $\mu$m and wherein the distance from the outer periphery of each said picture element electrode on a side where rubbing of said second substrate is started to said outer periphery of the opening is set in a range of 1 to 3 $\mu$m, and the distance from the outer periphery of each said picture element electrode on a side where rubbing of said second substrate is ended to said outer periphery of the opening is set in a range of 2 to 4 $\mu$m, with regard to the second direction.

18. A liquid crystal display device, comprising:

a first substrate, rubbed in a first direction, on which plural picture element electrodes are arranged in plural rows and columns, and a light shielding layer having an opening located inside an outer periphery of said picture element electrode and a data line to which each of said picture element electrodes on a same column is connected are arranged. wherein groups of said picture element electrodes arranged in each of said rows adjoining each other are alternately arranged;

a second substrate rubbed in a second direction different from the first direction, said second substrate being parallel to said first substrate; and a liquid crystal material filing space between said first and second substrates, wherein said picture element electrodes arranged on even-numbered ones of said rows and those arranged on odd-numbered ones of said rows are connected to said data line at respective sides opposite to each other, and each of said picture element electrodes and openings are structured so that, with regard to the first direction, the distance from the outer periphery of each said picture element electrode on a side where rubbing of said first substrate is started to an outer periphery of the opening is set larger than the distance from the outer periphery of said picture element electrode on a side where rubbing of said first substrate is ended to the outer periphery of the opening, and with regard to the second direction, the distance from the outer periphery of each said picture element electrode on a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates, wherein, if the distance between said first substrate and said second substrate is g, then the distance from the outer periphery of each said picture element electrode on a side where rubbing of said first substrate is started to said outer periphery of the opening is set to 5/4 g, and the distance from the outer periphery of each said picture element electrode on a side where rubbing of said first substrate is ended to said outer periphery of the opening is set to ⅘ g, with regard to the first direction.

19. A liquid crystal display device comprising:

a first substrate, rubbed in a first direction, on which are arranged plural picture element electrodes arranged in plural rows and columns, a light shielding layer having an opening in correspondence to each of said picture element electrodes, each opening being located inside an outer periphery of the corresponding one of said picture element electrodes, a transistor connected to each of said picture element electrodes, a signal line to which each of said picture element electrodes on a same column is connected, and a gate line to which each of said transistors on a same row is connected;

a second substrate rubbed in a second direction different from the first direction, said second substrate being parallel to said first substrate; and a liquid crystal material filling space between said first and second substrates, wherein the wiring pattern of said signal line and said gate line and the pattern of said transistors arranged on even-numbered ones of said rows are of a shape laterally reversed from those arranged on odd-numbered ones of said rows, and the positional relationship between said picture element electrode arranged on an even-numbered row and said opening arranged on the even-numbered row is identical to that between said picture element electrode arranged on an odd-numbered row and said opening arranged on the odd-numbered row, and each of said picture element electrodes and openings are structured so that, with regard to the first direction, the distance from the outer periphery of each said picture element electrode of a side where rubbing of said first substrate is started to an outer periphery of the opening is set larger than the distance from the outer periphery of said picture element electrode on a side where rubbing of said first substrate is ended to the outer periphery of the opening, and with regard to the second direction, the distance from the outer periphery of each said picture element electrode of a side where rubbing of said second substrate is started to the outer periphery of the opening is set smaller than the distance from the outer periphery of each said picture element electrode on a side where rubbing of said second substrate is ended to the outer periphery of the opening, as observed from a direction perpendicular to said first and second substrates.

* * * * *

UNITED STATES PATENT AND TRADEMARK OFFICE
CERTIFICATE OF CORRECTION

PATENT NO.      : 5,923,391
DATED           : July 13, 1999
INVENTOR(S)     : Takanori Watanabe et al.

It is certified that error appears in the above-identified patent and that said Letters Patent is hereby corrected as shown below:

<u>Title page, Item [54] and Column 1, line 1,</u>
Title, "HANG" should read -- HAVING --.

Item [56], References Cited, FOREIGN PATENT DOCUMENTS,
"1266512" should read -- 1-266512 --.
Item [57], ABSTRACT,
Lines 5 and 8, "lightshielding" should read -- light shielding --.

<u>Column 1,</u>
Lines 9 and 59, "lightshielding" should read -- light shielding --; and
Lines 62 and 64, "lightshielding" should read -- light shielding --.

<u>Column 2,</u>
Lines 20 and 31, "an" should read -- a --; and
Line 46, "lightshielding" should read -- light shielding --.

<u>Column 3,</u>
Line 12, "inventor has" should read -- inventors have --;
Line 17, "inventor has" should read -- inventors have --; and "his" should read -- their --;
Lines 24 and 26, "lightshielding" should read -- light shielding --;
Lines 31 and 34, "lightshielding" should read -- light shielding --;
Line 37, "mention" should read -- mentioned --;
Line 46, "(,i.e." should read -- (i.e., --; and
Line 48, "(,i.e." should read -- (i.e., --.

<u>Column 4,</u>
Line 15, "even" should read -- an even --;
Line 62, "the" (first occurrence) should read -- an --; and
Line 65, "numeral" should read -- numeral 102 --.

<u>Column 5,</u>
Line 56, "lightshielding" should read -- light shielding --; and
Line 57, "gbe" should read -- be --.

UNITED STATES PATENT AND TRADEMARK OFFICE
CERTIFICATE OF CORRECTION

PATENT NO.   : 5,923,391
DATED        : July 13, 1999
INVENTOR(S)  : Takanori Watanabe et al.

It is certified that error appears in the above-identified patent and that said Letters Patent is hereby corrected as shown below:

Column 6,
Line 46, "despite" should read -- despite the fact --.

Column 8,
Line 26, "larder" should read -- larger --; and
Line 44, "64 $\mu$m," should read -- 6 $\mu$m, --.

Column 9,
Line 37, "filing" should read -- filling --.

Column 10,
Line 30, "filing" should read -- filling --.

Column 11,
Line 11, "filing" should read -- filling --; and
Line 56, "filing" should read -- filling --.

Signed and Sealed this

Twenty-fourth Day of June, 2003

JAMES E. ROGAN
*Director of the United States Patent and Trademark Office*